United States Patent [19]
Johnson et al.

[11] 3,861,355
[45] Jan. 21, 1975

[54] AUTOMATIC MILKER TAKE OFF ASSEMBLY

[75] Inventors: Kendall R. Johnson; Arnold R. Fjermestad, both of Albert Lea, Minn.

[73] Assignee: Universal Cooperatives, Inc., Albert Lea, Minn.

[22] Filed: Feb. 25, 1974

[21] Appl. No.: 445,467

[52] U.S. Cl. ............................................. 119/14.08
[51] Int. Cl. .............................................. A01j 5/04
[58] Field of Search ................................. 119/14.08

[56] References Cited
UNITED STATES PATENTS 3,246,631   4/1966   Holm ............................ 119/14.08 X
3,603,292   9/1971   Finch ............................... 119/14.1
3,690,300   9/1972   Tonelli ............................ 119/14.08
3,789,798   2/1974   Reisgies et al. ................. 119/14.08

Primary Examiner—Hugh R. Chamblee
Attorney, Agent, or Firm—Schroeder Siegfried Ryan & Vidas

[57] ABSTRACT

A milker take off assembly for milking house operation in which a milker is mounted on an adjustable actuator linkage to be moved about three axes of movement permitting positioning of the milker beneath the animal in a milking stall and automatic removal of the same under control of a flow sensor from the milker to remove the milker and move it away from the stall and the animal upon completion of the milking operation.

9 Claims, 6 Drawing Figures

AUTOMATIC MILKER TAKE OFF ASSEMBLY

Our invention relates to an automatic milker take off assembly and more particularly to an improved automated take off assembly for use in automated milking barns which is adapted to automatically remove a milker upon predetermined milking conditions of the cow.

Automated milking barns and milking equipment are known and in use. Automated milker take off apparatus is also known. In milking operations under automated conditions, it is desired to have a flow sensor for eliminating the milking operation automatically under a condition wherein milk flow from the milker or cow reaches a predetermined low level. In the past, such apparatus has been complex and has not been adjustable for varying milking conditions for different types of animals. Similarly, they have required specialized power supplies for the milking barns increasing the overall cost and maintenance of the apparatus.

In the present invention we have provided an improved automated milker take off assembly which senses milk flow from a milker and hence from the animal with which it is associated so that the milking will be terminated at a predetermined flow level consistent with the desire of the milking condition of an animal. The apparatus or assembly is adjustable so that it may be adapted for varying animals so that it will enable usage of the same without milking cows to such a condition of dryness that it will affect their overall milk production. Similarly, the milker is readily removed from the position beneath the animal so that it will not interfere with the movement of the animal into and out of a milking stall. The improved milker take off assembly also utilizes a vacuum pressure source normally associated in automatic milking barns with milk flow lines and provides for an adjustable time within which the assembly is insuring that the milker will be retained in an operating condition to insure that a particular condition of milk flow from an animal has been reached. In the improved milker take off assembly, the vacuum line which provides for flow from the milker to a milk collecting line is also utilized for operating the milker take off apparatus and is selectively switched between such units with a positive seal on the other to prevent vacuum or pressure leakage into the atmosphere to affect the overall operation of the apparatus. The improved take off assembly utilizes a single valve and flow sensor which is adjustable for varying milk conditions. The take off assembly provides for three axes of movement of the milker on the milker support unit which enables ease in movement of the milker away from beneath the cow and readily into position beneath the cow with adjustments in height and distance for application to all animals.

It is therefore a principal object of this invention to provide an improved milker take off assembly.

Another object of this invention is to provide a milker take off assembly apparatus which uses vacuum pressure as a motive source for its operation.

Another object of this invention is to provide an improved milker take off assembly which utilizes a single actuator for operating the same.

A still further object of this invention is to provide an improved milker take off assembly in which sensitivity to flow may be adjusted for varying milking requirements of animals.

A still further object of this invention is to provide an improved milker take off assembly which is relatively low in cost, easy to use and maintain.

These and other objects of this invention will become apparent from the reading of the attached description together with the drawings therein.

Figure 1:
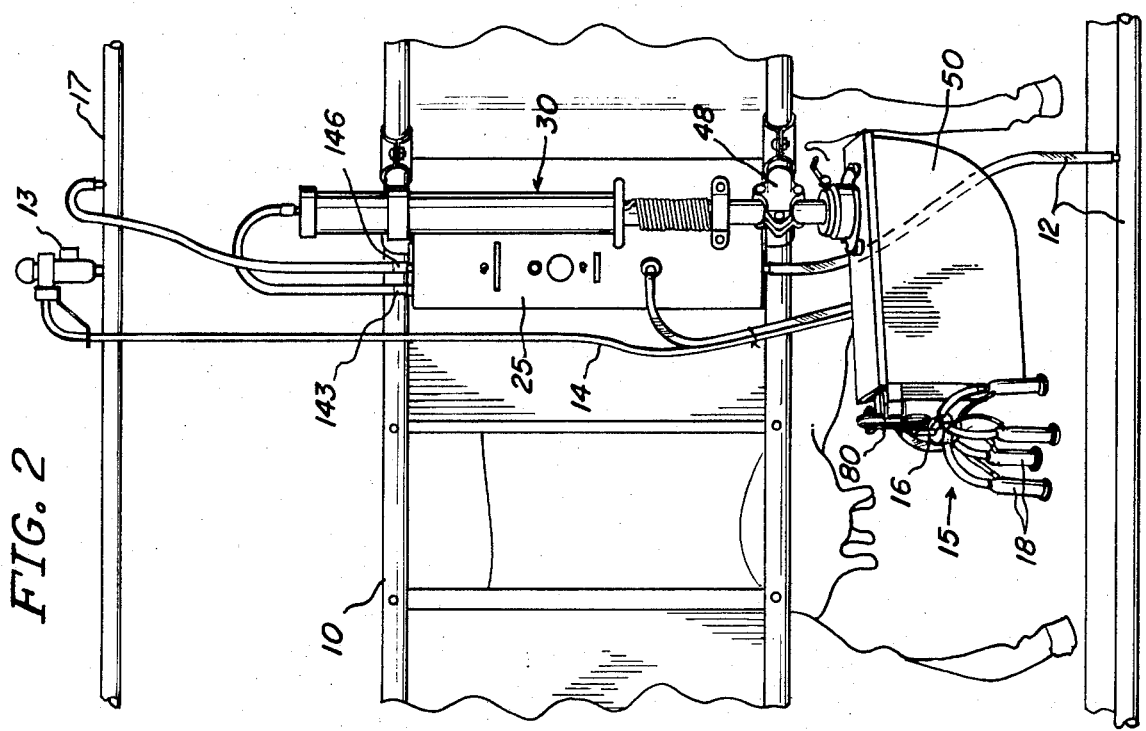
FIG. 1 is a perspective view of the improved milker take off assembly shown in a milking barn application with the milker in an operative positions.
Figure 2:
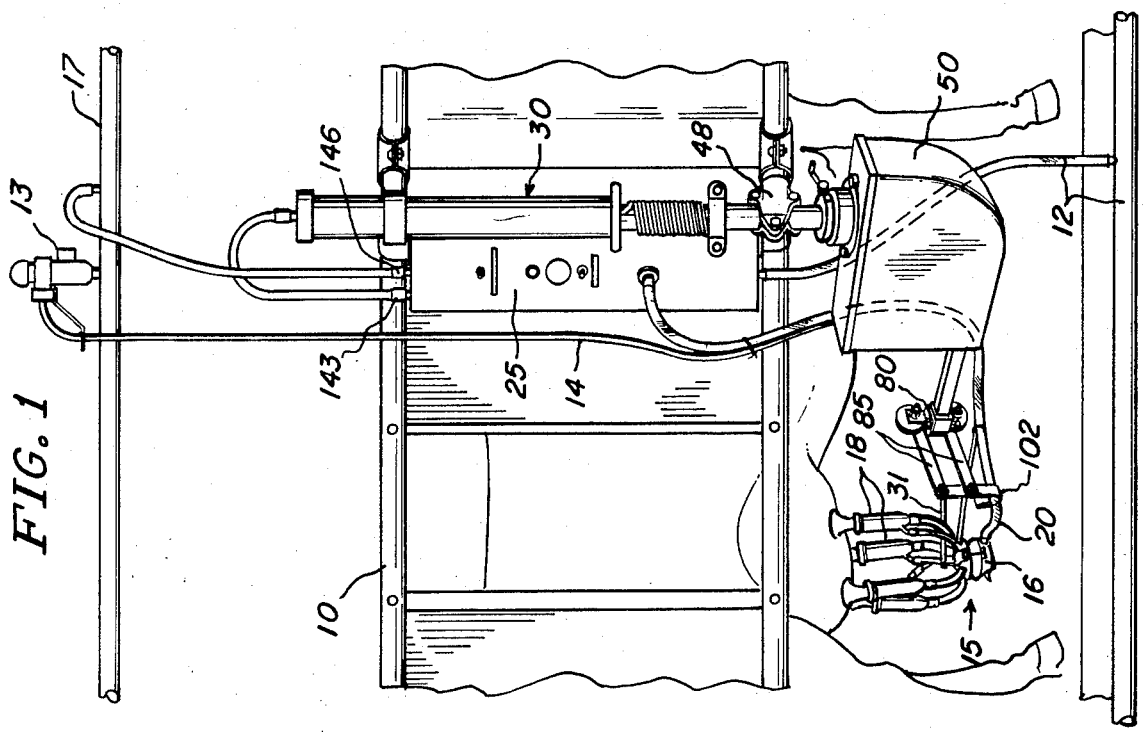
FIG. 2 is a perspective view of the improved milker take off assembly shown in a milking barn application with the milker in a stored position.
Figure 3:
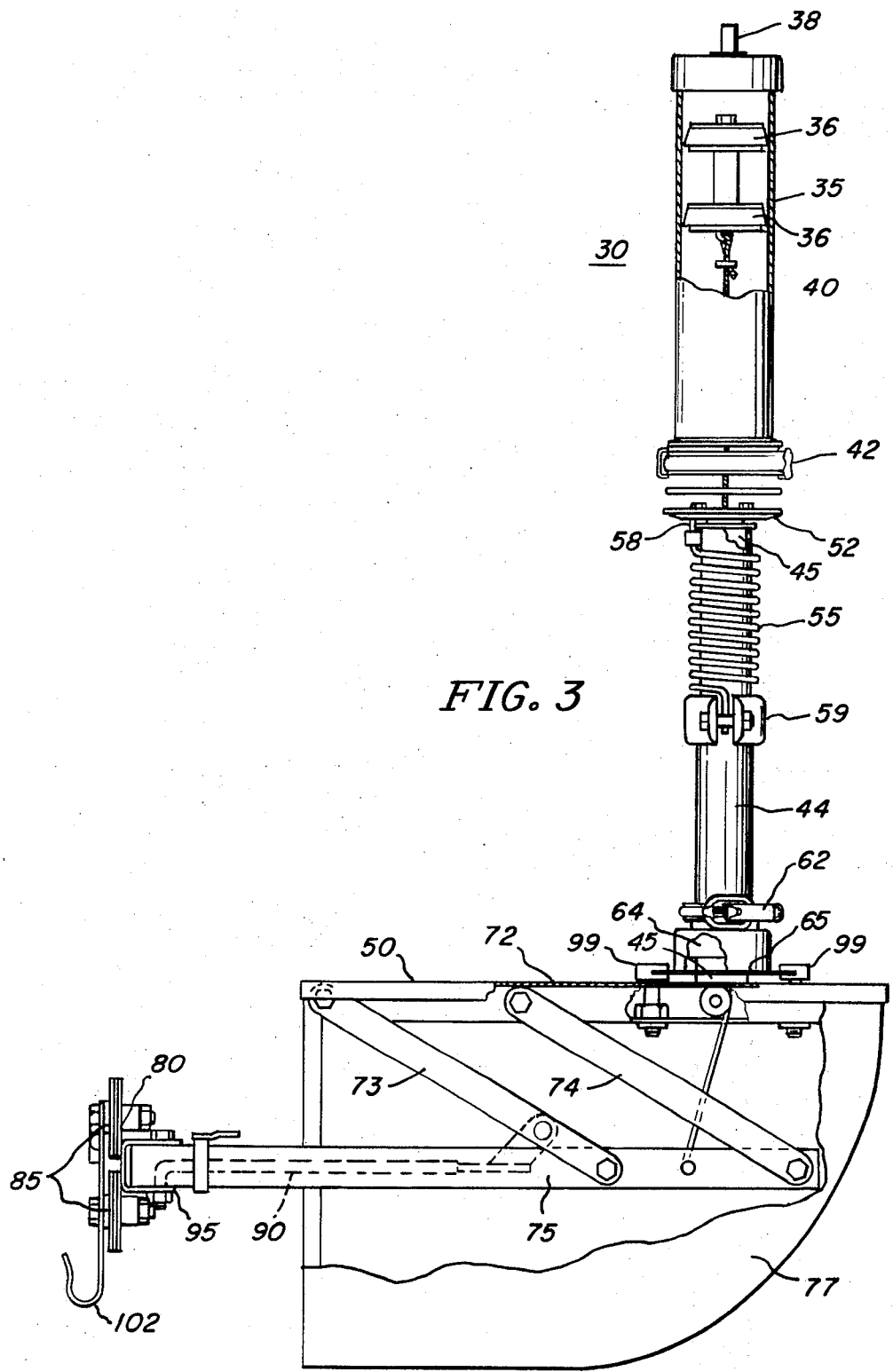
FIG. 3 is a side elevation view of the improved take off assembly with parts in section.

Our improved milker take off assembly is shown in FIGS. 1 and 2 in connection with a stall of a milking house. In FIGS. 1 and 2, the stall is defined by a frame work 10 having an access side (not shown) through which a cow is moved into and out of the stall for milking purposes. The frame work 10 serves the additional purpose of defining a support structure for the milker and the vacuum and electrical lines normally incident to the milking house operation. Thus, in FIGS. 1 and 2, the milk collecting line is shown generally at 12 which line normally extends through the milking house and takes milk from individual milking stalls and directs the same to a collecting tank under the influence of a vacuum or negative pressure, this pressure being applied to the end of the milk collecting line 12. Such line would normally be used to transmit water or a cleaning solution during cleaning of the lines and milker in a conventional manner. The details of the pressure system and the cleaning system for the milking lines is omitted since it has no direct relationship to the present invention. Similarly, as shown in FIGS. 1 and 2, a pulsating negative pressure line 14 operating the teat cups of the milker in the withdrawal of the milk from the cow or animal is shown schematically, this being connected to a periodic pulsing apparatus 13 on the vacuum line 17 for operation of the milker in a conventional manner. The milker assembly or milker is shown generally at 15 as incorporating a bowl or reservoir section 16 with a plurality of teat cups 18 connected thereto, the individual teat cups having associated bladder mechanism adapted to be connected to the pulsating vacuum line 14 for operation of the same. The reservoir or collecting cup has a milk withdrawal port 20 connected thereto which leads to the control portion and sensor portion of the milker take off apparatus which will be hereinafter defined. Thus, as will be seen in FIGS. 1 and 2 and shown in detail in FIGS. 3 and 4, the milker take off apparatus includes a control panel, indicated at 25, which is mounted on the frame 10 and in proximity with the milker support and take off structure, indicated generally at 30. The milker support and take off structure includes a claw or bracket 31 which mounts the milker assembly 15 at the extremity of the same. Thus, as will be seen in FIGS. 1–3, the support assembly 30 includes an upper cylindrical portion 35 defining the cylinder for an actuator having a suitable piston 36 therein which is adapted to be moved between raised and lowered position under the influence of vacuum pressure and/or gravity. A suitable vacuum line 38 is connected to the end of the cylinder assembly for the purpose of applying the vacuum pressure thereto.

The pistons have a cable 40 attached thereto which cable extends out of the opposite extremity of the cylinder and through a coupling member 42 which couples a pair of cylinders attached to the support assembly. The inner cylinder 45 mounts the holding portion 50 of the support structure while the outer cylinder 44 and actuator are secured to the frame or suitable brackets such as is indicated at 48. A collar 52 is secured to the inner cylinder 45, the collar mounting one end of the coil spring 55, as at 58. The opposite extremity of the coil spring which is wound around the outer cylinder 44 is secured to the cylinder by means of a clamp 59. The outer cylinder is also coupled through coupler 62 which mounts a bearing 64, the bearing carrying flange members 65 at the ends of the same. This entire structure journals the inner hollow cylinder member 45 through which the cable 40 extends. The inner cylindrical member 45 mounts the holder portion 50 of the support which is an enclosure and mounting for a linkage system to be hereinafter defined. The holder portion 50 includes a top plate 72 which is secured to the end of the inner cylindrical member 45 and which mounts a pair of parallel arms 73, 74 the arms carrying an elongated plate 75 at the other extremity in a parallel linkage type system. The end of the cable 40 is attached to the plate 75 and the upper supporting plate 72 has attached thereto side plate member 77, a curved arcuate plate 78 to form an enclosure for the holder portion 50 which is open at one extremity through which the plate member 75 extends. As the cable is withdrawn or raised, the plate member 75 moved parallel to the supporting plate 72 through the mounting of the linkage arms 73, 74, causing the same to be drawn into the closure or holder portion 50 until the plate 75 is substantially in contact or near butting relationship with the supporting plate 72. With the cable 40 slack or extended, the arms 73, 74 move arcuately to extend the free end of the plate 75 out of the holder portion or enclosure 50 and away from the same. This free end of the plate 75 carries a hinge member 80 at the end with a set of parallel linkage arms 85 having the hook or claw 31 at the end of the same, the hook mounting the collection cup 16 of the milker to support the same. The hinged arms 85 with the hook on the end pivot relative to the end of the plate 75 through a pivotal connecting member 90 which is pinned thereto by means of a journaled flange section 95 and which is connected at its opposite extremity through a pivot connection 96 to the pivot arm 73. Thus, as the plate 75 is raised relative to the plate 72, the arm is withdrawn and the supporting structure for the milk collection bowl 16 is pivoted toward the support structure. As the arms separate, the supporting arms 85 and the hook 31 are pivoted away from the carrying plate 75 on the hinge structure 80 to support the milker or extend the same beneath the animal to be milked. Mounted in the plate 72 are a pair of slide pins 99 which cooperate with a latch flange 65 carried by the bearing 64. As the plate 75 is raised, it will contact the pins raising the same in the support member 72 of the holder portion allowing the heads of the pins 99 to move clear of the latch flange 65 and allow rotation of the plate 72 and hence the inner cylindrical member 45 relative to the outer cylindrical member 44. This will permit the holder portion 50 to rotate substantially 90° relative to the shaft 44 which is secured to the frame 10 of the milking stall allowing the milker 15 to be swung clear from the milking stall and the animal to which the milker was applied.

In the set up of the milker on the animal, the cable is allowed to drop through the influence of gravity and release of the pistons 36 to which it is attached within the cylinder 35, allowing the parallel arms to pivot the plate 75 away from the plate 72 and extend the milker beneath the animal or into the stall. The operator will then rotate the entire holder portion 50 through the shaft or cylindrical member 45 and on the shaft portion or outer cylindrical member 44 which is attached to the frame. The holder portion will be moved so that plate or arm is extended to be directed into the milking stall beneath the animal to be milked. The parallel support arms 85 are frictionally mounted so that the entire milker assembly may be elevated with respect to the animal bringing the teat cups 18 beneath the utters so that they may be attached to the animal for milking purposes. The milk withdrawal line from port 20 is supported through a hook 102 on the arms 85 and extends into the control box or panel 25 to be controlled by a valve therein as will be hereinafter defined.

Figure 4:
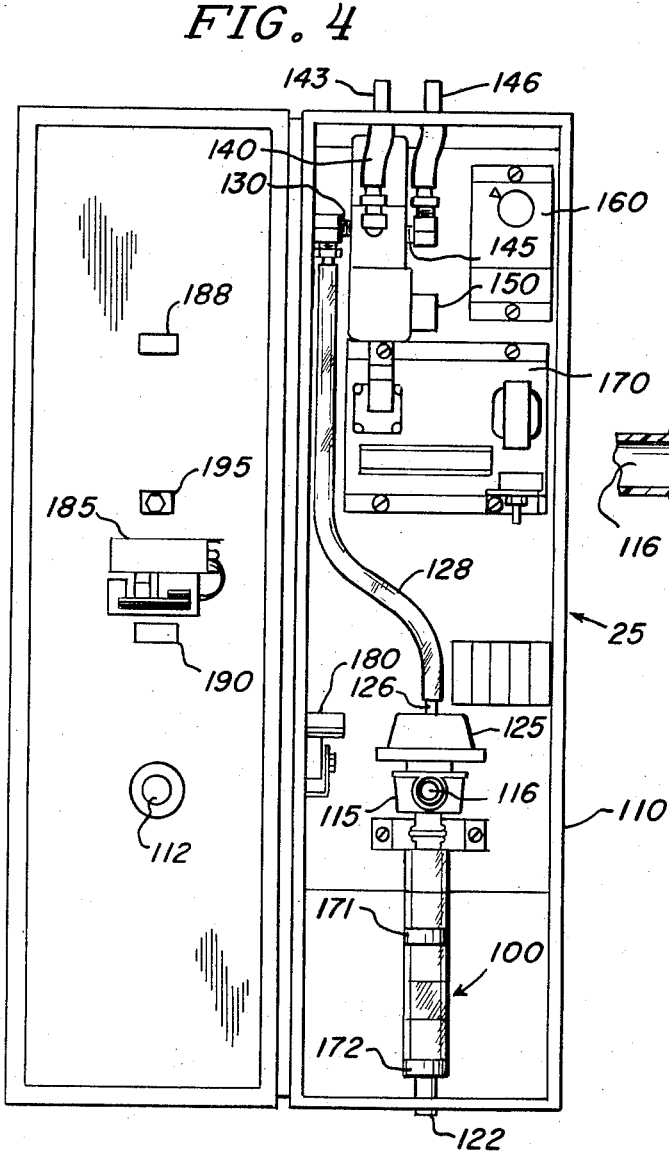
FIG. 4 is a sectional view of the portion of the take off assembly showing the positioning of the controls and the flow sensor and valve for the same, and, FIG. 5 is a schematic wiring diagram for the improved take off assembly.
Figure 6:
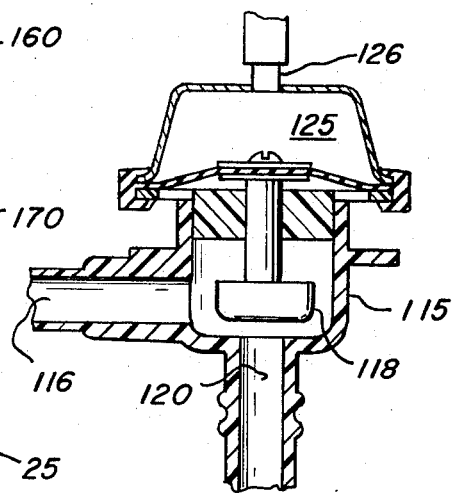
FIG. 6 is a sectional view of the milk valve.

As will be seen in FIGS. 4 and 6, the control 20 includes a mounting frame or box 110 which mounts therein a sensor section or sensor unit to be positioned in the milk flow line. An opening 112 in the center of the box provides a passage for the milk withdrawal port 20 to a valve body 115 of the milk valve having a port 116 therein. The plastic tubing or milk line from the milker bowl 16 is connected thereto carrying milk flow into the body of the valve up stream of the valve closure member 118 with the outlet of the valve, as indicated at 120, leading to flow sensor 110 and from the flow sensor to an outlet port 122 to the milk collecting line 12. Positioned on the milk valve is an actuator 125 of the diaphragm type having a control port 126 behind the diaphragm leading through a conduit 128 to an outlet port 130 of a control valve 140 also positioned into the control box. Control valve 140 has an outlet port 142 leading through a pipe 146 to the vacuum source line 17 for operating the take off mechanism which may be the same source as that connected to the milk collecting line 12. Valve 140 also has a second outlet port 145 leading through a pipe 143 to the inlet 38 of the actuator 35 of the take off assembly. Valve 140 is a conventional three way valve in which the vacuum source or inlet port 146 is switched between the outlet ports 130 and 145 selectively through operation of the actuator 150. With the switching arrangement, the port not connected to the inlet port 142 is vented to atmosphere to allow the actuators associated therewith to resume an alternate position from that for which the vacuum pressure was applied. The control box or cabinet also has a timer 160 mounted therein which is connected in circuit with the energization coils or electro magnets 150 of the valve to control the operation of the same upon predetermined control signals. Also positioned in the control cabinet is an amplifier panel 170 whose input signal is supplied from the conductor rings 171, 172 of the sensor 100 as will be hereinafter defined. The control cabinet also mounts a control relay 180 within the same and on the door 111 of the control box is positioned a manually operated timer 185, a pair of control switches 188 and 190 and an indicating light 195 to be hereinafter defined. These components within the control cabinet are connected in a schematic circuit diagram for the control 25 such as is indicated in FIG. 5.

Figure 5:
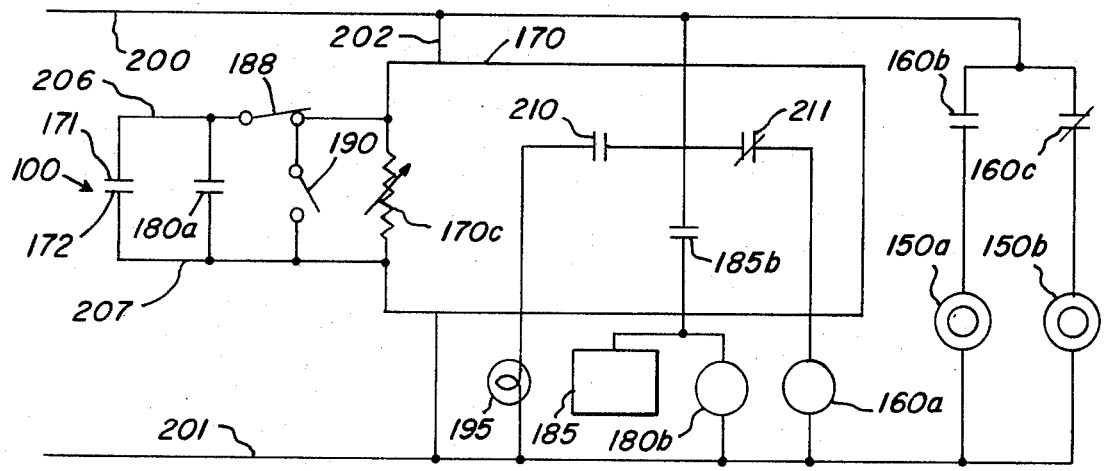

In FIG. 5 the power supply is evidenced by conductors 200, 201, which lead to the amplifier panel 170 energizing the same across the power conductors through conductors 202 and 203. The input to the amplifier includes the sensor 100 or its contact rings 171, 172, connected in parallel across the conductors 206, 207 with a relay contact 180(a). The manually open toggle switch 188 or the manual take off switch is in series circuit with conductor 206 and one side of the input of the amplifier and connected in parallel across the input of the amplifier is the manually operated toggle switch 190 which is the wash or milk switch. The input or control circuit places the relay contact 180(a) in parallel with the sensing contact 171, 172 of the sensor and in parallel with the manually operated toggle switch 190 across the input. The input can be isolated by opening the toggle switch 188 to effect a manual take off of the apparatus. The amplifier includes a normally open, normally closed contact indicated at 210, 211, respectively. These are connected in common to the supply conductor 200 with a normally open contact being connected through the indicating light 195 to the conductor 201. The normally closed contact 211 is connected through the coil 160(a) of the timer motor or timer 160. Also connected across the supply conductors is the relay coil 180(b) and the override timer motor 185, both of which are connected in parallel and to the conductor 201 with the contact 185(b) of the override timer motor being connected in series therewith and to the supply conductor 200. The timer 160 contains normally open contact 160(b) and normally closed contact 160(c) which are connected in common to the supply conductor 200 and through separate coils 150(a) and 150(b) of the actuator 150 for the control valve 140 controlling the application of vacuum pressure to the milk valve actuator 125 or the actuator 35 of the take off assembly. Thus, in the improved control circuit, whenever it is desired to go to a milking type function, the actuator 35 will be energized allowing the vacuum pressure to be switched to the actuator 125 from the control valve 140 opening the milking valve 118 and allowing coupling between the milk withdrawal port 20 to the milk collecting line 12 through the sensor 100. Under these circumstances, the actuator 35 will be vented to atmosphere allowing the pistons in the cylinder to drop under the influence of gravity, lowering the cable 40 and allowing the parallel linkage system to drop so that the plate member 75 will move out of the holder portion 50 and extend the milker 15 attached thereto into the milking stall beneath the animal to be milked. In order to affect an initial milking setup, the override control 185 includes a manual control handle positioned on the outside of the control cabinet which is operated to close the contact 185(b) setting up an energizing circuit for the override motor 185 which times the length of closure of the contact 185(b) for a given period of time, for example, one minute. Simultaneously, therewith the relay coil 180(b) is energized and the contact 180(a) is closed. This will provide an input circuit to the amplifier 170 which includes an adjustable resistance 170(c) in series therewith internally of the amplifier. Thus, the amplifier is energized with the contact 210 opened and 211 closed. With the closure of contact 210 the indicating light 195 will be eliminated and the timer motor 160 of the timer will be deenergized. This will cause the contact 160(c) to be returned to a normally closed condition opening the milk valve to allow for the milking operation. Pulsating pneumatic pressure will be applied to the teat cups through the independent vacuum line 14 and the vacuum on the milk collecting line will draw milk from the collecting bowl 16 through the milk valve 140 and sensor 100 to the milk collecting line. With milk flow through the sensor, a circuit will be made between the conductive rings 170, 171, establishing a contact or circuit in parallel with the relay contact 180(a) which will open whenever the override timer motor times out. This will sustain the amplifier 170 energized to maintain the de-energization of the timer motor 160(a). The de-energization of timer motor 160 continues the circuit through the normally closed conduct 160(c) to coil 150(b) of the milk valve energizing the switching valve 140 so that the actuator 125 will be energized to open the milk line. The actuator 35 will be vented to atmosphere allowing the milking assembly to be in the milking position. During the period of time that the timer of the override control 185 is operated, the operator will rotate the holder portion 50 of the support assembly on the shaft portion causing the inner cylindrical member 45 to rotate relative to the fixed outer cylindrical member 44 which is secured to the frame rotating plate 75 and allowing the milker to be brought into position where the teat cups may be attached to the animal. When milk flows, the amplifier will remain in the energized condition and the milk valve 140 will remain open allowing milk flow through the sensor 100 to the milk collecting line 12. Whenever the milk flow from the animal reaches a level inicative of the need for cessation of milking operation, the resistance across the contacts or rings 170, 171 will rise to a level due to insufficient milk flow across the same where the amplifier will de-energize turning off the light 195 and energizing the timer motor 160. This will time a predetermined function as adjusted by a manual adjustment on the timer face after which the contact 160(b) will close and the contact 160(c) will open. This will provide energization of the valve 140 in such a manner as to apply vacuum pressure to the actuator 35 and permit the actuator 125 to close under the influence of gravity. This will cut off the milk collecting line from the milker cutting off the vacuum pressure to the milker cup and vent the same to atmosphere through the valve body 115 and at the same time cause the piston in the actuator 35 to rise withdrawing the cable 40 and moving the linkage system to an elevated position. As the linkage system is moved to a raised or elevated position, the milker 15 is withdrawn from beneath the animal through the pivoting of the arms 85 on the hinge 83 and the movement of the plate member 75 arcuately within the holder portion 50 causing the withdrawal action of the milker from beneath the animal and the milking stall. As it reaches the elevated position wherein the pins 99 are contacted, the pins are raised releasing the catch on the bearing and allowing the entire holder portion 50 to rotate with the inner cylindrical member 45 to move the milker 15 out and away from the milking stall.

During a milking operation, if it is desired to manually remove the milker 15 the contact 188 is open, affecting the open circuit from the sensor 100 and presenting the same input to the amplifier as would be occasioned by lack of milk flow through the sensor. This would automatically initiate de-energization of the amplifier and a switching in the energization of the valve coils 150(a) 150(b) to provide the take off operation.

Whenever the equipment is to be cleaned, the switch 190 is closed for a washing cycle. This will permit the amplifier to be energized causing the milk valve to open and permit the flow of water through the milker 15 and milk lines 12 to affect cleaning of the same. Under normal operation, the switch 190 is normally open for a milking cycle and closed to short out the sensor for a wash cycle.

In the improved take off apparatus, the suction or vacuum pressure on the milk collecting line and in the milk withdrawal port through the milker will be applied around the utters to hold the teat cups in position. The pulsating vacuum pressure is applied through the pulsator and will be independently controlled to provide the massaging action for the utters to draw the milk from the bladder. Whenever the milk valve is closed, breaking the vacuum from the milk collecting line, and venting the milker, the teat cups will fall away from the utters permitting removal of the milker from the animal. The supporting arms 85 for the take off assembly permits vertical adjustment of the milker relative to the animal and independent of the movement of the plate 75 of the linkage system to adjust the position of the same beneath animals of varying height. The variable resistance 170(c) associated with the amplifier 170 provides for an input signal which may be varied in magnitude or variable resistance across the collector rings 171, 172 of the sensor to adjust milking conditions so that varying animals could be milked to a different degree of dryness in a conventional milking operation depending upon desired conditions. The normal resistance value of the milk flow between the rings will provide the input signal to maintain the amplifier energized with normal milk flow and whenever this drops below a predetermined level indicating a need for cessation of the milking, the resistance value between the rings will increase to become such a value that the input signal in the input circuit will drop so that the amplifier will be de-energized providing the necessary switching operation to change the operation of the valve 140. With the improved milker take off assembly, the motivating power source is the vacuum supply normally available in the milk house for movement of milk through the milk collecting lines to a place of storage. The improved system provides for a manual take off and the shutting off of the controls to permit washing of the apparatus in a conventional manner.

The improved milker take off assembly permits a single operator to maintain milking operations in a milk house having a plurality of stalls to service or milk a large number of animals. The time delay of the override control permits time for the operator to position the milking apparatus beneath the animal and attach the same to them to initiate a milking operation. The milking and removal of the apparatus to a stored position is automatic whenever the milking conditions of the individual animal indicate that the milking is completed. Similarly, the take off assembly isolates the milk collecting line except under conditions of actual milk flow from the animal to prevent introduction of contaminants thereto.

In considering this invention it should be remembered that the present disclosure is illustrative only and the scope of the invention should be determined by the appended claims.

What we claim is:

1. A milker take off assembly comprising a milker having teat cups with a collecting bowl and a milk withdrawal line connected thereto, a source of vacuum pressure, a milk collecting line, three way valve means for connecting the milk withdrawal line to the milk collecting line in one position of the valve means, a mounting assembly for holding the milker in position of usage, said mounting assembly including a shaft portion with a holder portion journaled on the shaft portion for limited rotative movement, spring means for rotating the holder portion on the shaft portion, a pair of linkage means mounted in the holder portion and connected to and mounting the milker to move the milker about two axes of movement toward and away from the holder portion, actuator means mounted in the shaft portion and connected to the linkage means to pivot the linkage means, conduit means connecting the actuator means to the vacuum pressure source through said valve means in another position of operation of the valve means, a flow sensor positioned in the milk collecting line leading from the valve means, and means responsive to the absence of flow through the sensor to energize the valve means to the other position and connect the actuator means of the mounting assembly to the vacuum source of pressure to pivot the linkage means and cause rotation of the holder portion on the shaft portion to move the milker out of a position of usage.

2. The milker take off assembly of claim 1 and including time delay means connected in circuit with the means responsive to the absence of flow through the sensor to delay energization of the valve means to said other position.

3. The milker take off assembly of claim 2 in which the time delay means is an adjustable time delay means.

4. The milker take off assembly of claim 1 in which the holder portion of the mounting assembly for the milker is adapted to be manually rotated on the shaft portion to position the milker in a position of usage.

5. The milker take off assembly of claim 4 in which the holder portion of the mounting assembly includes a spring bias means on the shaft portion held in position by a latch means securing the holder portion on the shaft against rotation and including release means in the holder portion actuated by movement of the linkage to a predetermined position to move the holder portion of the mounting assembly and hence the milker away from the position of usage upon movement of the linkage toward the holder portion and rotation of the shaft portion through the spring bias means.

6. The milker take off assembly of claim 1 in which the mounting assembly mounts the milker about three axes of movement to provide for movement of the milker between a position of usage and a position of storage with energization of the actuators.

7. The milker take off assembly of claim 1 in which the flow sensor is a pair of conductive rings with electrical connections thereto leading to the means responsive to the flow sensor for energizing the same.

8. The milker take off assembly of claim 7 in which the means responsive to the flow through the sensor is an amplifier means controllably energized by said sensor and operative to energize the valve means to actuate the same to the other position of operation.

9. The milker take off assembly of claim 8 and including an adjustable resistor means included in the amplifier means and cooperating with sensor rings to adjust the resistance therein and vary the response of the amplifier means for a different rate of flow through the flow sensor.

* * * * *